(12) United States Patent
Sargent et al.

(10) Patent No.: US 11,151,703 B2
(45) Date of Patent: Oct. 19, 2021

(54) ARTIFACT REMOVAL IN MEDICAL IMAGING

(71) Applicant: INTERNATIONAL BUSINESS MACHINES CORPORATION, Armonk, NY (US)

(72) Inventors: Dustin Michael Sargent, San Diego, CA (US); Sun Young Park, San Diego, CA (US); Maria Victoria Sainz de Cea, Somerville, MA (US); David Richmond, Newton, MA (US)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 16/568,346

(22) Filed: Sep. 12, 2019

(65) Prior Publication Data

US 2021/0082092 A1    Mar. 18, 2021

(51) Int. Cl.
    *G06T 5/00*    (2006.01)
    *G06T 5/50*    (2006.01)
    (Continued)

(52) U.S. Cl.
    CPC .............. *G06T 5/50* (2013.01); *G06T 3/4046* (2013.01); *G06T 5/005* (2013.01); *G06T 11/00* (2013.01);
    (Continued)

(58) Field of Classification Search
    CPC ......... G06T 5/005; G06T 5/50; G06T 3/4046; G06T 11/00; G06T 2207/20081; G06T 2207/20084; G06T 1/20
    See application file for complete search history.

(56) References Cited

U.S. PATENT DOCUMENTS

| 7,778,490 B2 | 8/2010 | Quist |
| 8,644,636 B2 | 2/2014 | Shin et al. |
| (Continued) | | |

FOREIGN PATENT DOCUMENTS

| CN | 107958471 A | 4/2018 |
| CN | 109166102 A | 1/2019 |
| (Continued) | | |

OTHER PUBLICATIONS

Jintamethasawat et al., "Limited angle breast ultrasound tomography with a priori information and artifact removal", Abstract, Date Published: Mar. 13, 2017, Proc. SPIE 10139, Medical Imaging 2017: Ultrasonic Imaging and Tomography, 101390N (Mar. 13, 2017); doi: 10.1117/12.2253911, Medical Imaging 2017: Ultrasonic Imaging and Tomography, 1 page.

(Continued)

*Primary Examiner* — Chan S Park
*Assistant Examiner* — Claude Noel Y Zanetsie
(74) *Attorney, Agent, or Firm* — L. Jeffrey Kelly

(57) ABSTRACT

An embodiment of the invention may include a method, computer program product and computer system for image artifact removal. The method, computer program product and computer system may include computing device which may receive a primary image and analyze the primary image for global artifacts and local artifacts. The computing device may, in response to identifying a global artifact in the primary image, generate a secondary image with the global artifact removed utilizing a first generative adversarial network. The computing device may, in response to identifying a local artifact in the primary image, generate a patch with the local artifact removed utilizing a second generative adversarial network. The computing device may generate a hybrid image containing a reduction of global artifacts and a reduction of local artifacts by combining the secondary (Continued)

image and the patch utilizing a hybrid generative adversarial network.

20 Claims, 7 Drawing Sheets

(51) Int. Cl.
G06T 11/00 (2006.01)
G06T 3/40 (2006.01)
(52) U.S. Cl.
CPC .............. G06T 2207/20081 (2013.01); G06T 2207/20084 (2013.01)

(56) References Cited

U.S. PATENT DOCUMENTS

| | | | |
|---|---|---|---|
| 8,675,944 B2 | 3/2014 | Razeto et al. | |
| 9,153,012 B2* | 10/2015 | Bredno | G06T 5/00 |
| 9,265,460 B2 | 2/2016 | Boas | |
| 10,089,720 B2 | 10/2018 | Koehler et al. | |
| 10,204,427 B2 | 2/2019 | Zhang | |
| 2015/0332475 A1* | 11/2015 | Shroff | G06T 7/246 382/103 |
| 2017/0249759 A1* | 8/2017 | Hsieh | G06T 5/50 |
| 2017/0365047 A1* | 12/2017 | Beque | G06T 5/005 |
| 2019/0128989 A1* | 5/2019 | Braun | G06T 5/003 |

FOREIGN PATENT DOCUMENTS

| | | |
|---|---|---|
| EP | 3447721 A1 | 2/2019 |
| EP | 3447731 A1 | 2/2019 |

OTHER PUBLICATIONS

Maitra et al., "Artifact Supression and Homogenous Orientation of Digital Mammogram using Seeded Region Growing Algorithm", International Journal of Computer Information Systems, vol. 3, No. 4, Oct. 2011 Issue, 7 pages.

Vikhe et al., "Mass Detection in Mammographic Images Using Wavelet Processing and Adaptive Threshold Technique", Transactional Processing Systems, J Med Syst (2016) 40:82, 16 pages.

Wang, et al. "Discriminative Region Proposal Adversarial Networks for High-Quality Image-to-Image Translation." ECCV (2018).

Mell et al., "The NIST Definition of Cloud Computing", National Institute of Standards and Technology, Special Publication 800-145, Sep. 2011, 7 pages.

* cited by examiner

ARTIFACT REMOVAL IN MEDICAL IMAGING

BACKGROUND

The present invention relates generally to a method, system, and computer program for image artifact removal. More particularly, the present invention relates to a method, system, and computer program for analyzing medical images for global and local artifacts to generate a new image that may be without global and local artifacts or that may include fewer global and local artifacts than the original image.

Medical imaging includes techniques and processes to create visual representations of the interior of a body for clinical analysis and medical intervention. Further, medical imaging seeks to provide a visual representation of the functions of some organs or tissues. Medical imaging also seeks to reveal internal structures which may be hidden by skin and/or bones, as well as to diagnose and treat disease. Medical imaging has allowed the medical community to establish a database of normal anatomy and physiology enabling the identification of physiological abnormalities including indicators of disease.

BRIEF SUMMARY

An embodiment of the invention may include a method, computer program product and computer system for removing image artifacts. The method, computer program product and computer system may include computing device which may receive a primary image. The primary image may be a medical image. The computing device may analyze the primary image for global artifacts and local artifacts. The computing device may, in response to identifying a global artifact in the primary image, generate a secondary image with the global artifact removed utilizing a first generative adversarial network. The computing device may, in response to identifying a local artifact in the primary image, generate a patch with the local artifact removed utilizing a second generative adversarial network. The generated patch may correspond to the area of the primary image containing the local artifact. The computing device may generate a hybrid image containing a reduction of global artifacts and a reduction of local artifacts by combining the secondary image and the patch utilizing a hybrid generative adversarial network. Further, the computing device may increase the resolution of the hybrid image.

The computing device may train the first generative adversarial network to generate an image of the patient without the global artifact based on the second image of the patient. The computing device may train the first generative adversarial network by receiving a first image of a patient captured at a first period of time containing a global artifact and receiving a second image of the patient captured at a second period of time containing no artifacts, pairing the first image and the second image of the patient, an inputting the paired first image and second image of the patient into the first generative adversarial network.

The computing device may train the second generative adversarial network to generate a patch for the first image with the local artifact removed based on the second image of the patient. The computing device may train the second generative by receiving a first image of a patient captured at a first period of time containing a local artifact, receiving a second image of the patient captured at a second period of time containing no artifact, pairing the first image and the received image of the patient, and inputting the paired first image and second image of the patient into the second generative adversarial network.

The computing device may train the hybrid generative adversarial network to generate an image with a patch smoothly integrated into an image. The computing device may train the hybrid generative adversarial network by receiving a plurality of unpaired images and patches of a plurality of patients containing no global or local artifacts and inputting the plurality of unpaired images and patches into the hybrid generative adversarial network.

BRIEF DESCRIPTION OF THE DRAWINGS

FIG. 1b illustrates example operating modules of the artifact removal program of FIG. 1a.

FIG. 1c illustrates an example marked image identifying global artifacts by the artifact removal program of FIG. 1a.

FIG. 1d illustrates an example marked image identifying local artifacts by the artifact removal program of FIG. 1a.

DETAILED DESCRIPTION

Figure 1A:
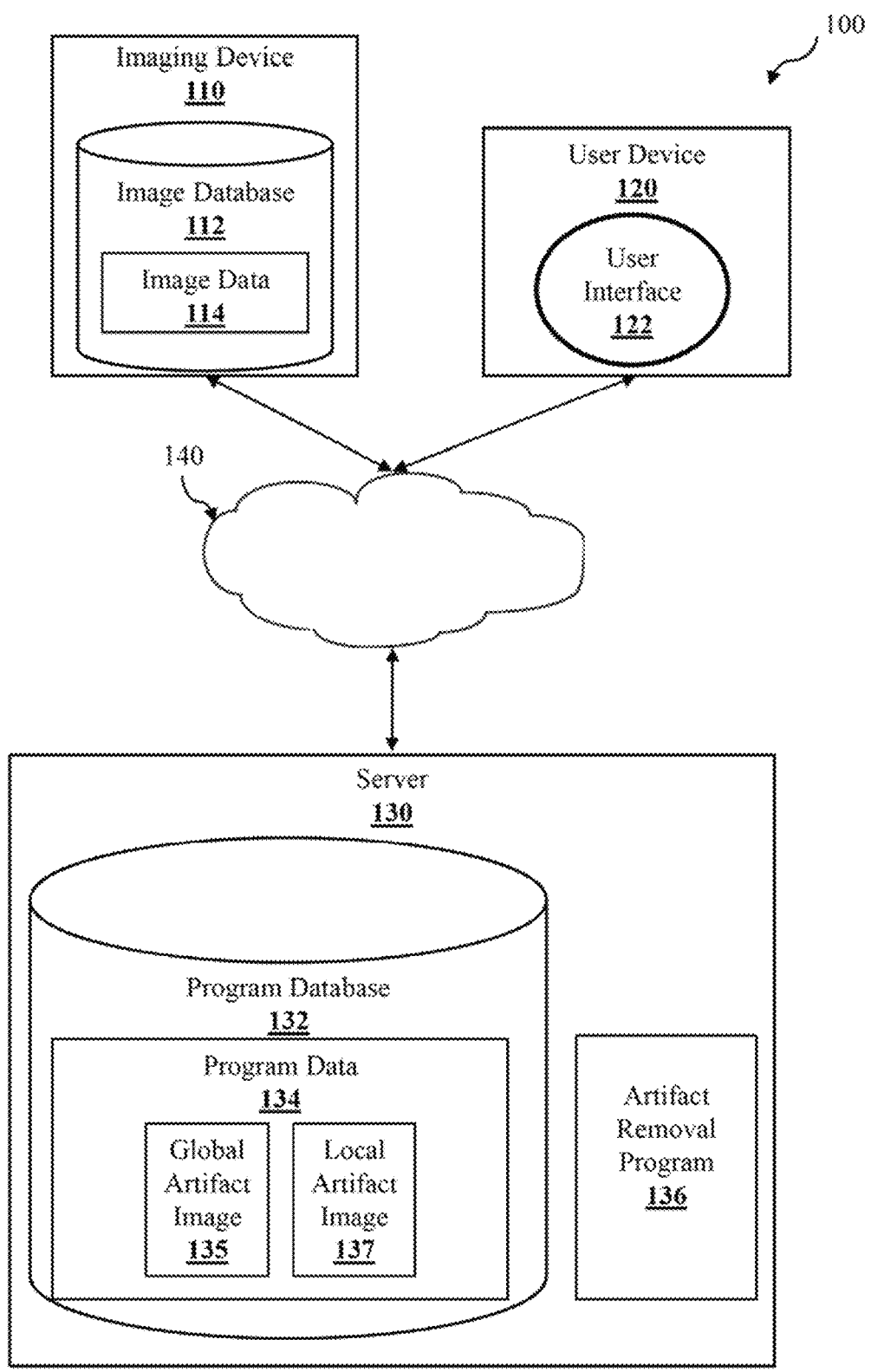
FIG. 1a illustrates a system for image artifact removal and image generation, in accordance with an embodiment of the invention.

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention provide a method, computer program, and computer system for generating an image with a reduced number of global and/or local artifacts. Diagnostic imaging (screening) is commonly performed using various medical imaging technologies such as, but not limited to, full-field digital mammography (FFDM) and digital breast tomosynthesis (DBT). Various types of artifacts can degrade the quality of the diagnostic images, including global and local artifacts. Artifacts may be defined as anomalies apparent during visual representation (e.g. FFDM images, DBT images). Global artifacts may include, but are not limited to, image ghosting, paddle artifacts, field inhomogeneity, underexposure, or blur. Local artifacts may include, but are not limited to, biopsy clips, dust on the compression paddle, antiperspirant, or hair. The presence of global and/or local artifacts may result in the need for additional imaging (e.g. re-image the same view) which causes an increase in overall exposure to the patient in addition to unnecessary stress and patient recall inconvenience. Additionally, an artifact within an image may be misinterpreted as a pathological finding (e.g. dust looking like calcifications), causing diagnostic errors.

Embodiments of the present invention utilize a multi-scale deep learning approach to remove or reduce the number of global and local artifacts found within an image and replace the affected image regions with synthetic data. With current technology, a generative adversarial network (i.e. GAN) is mostly capable of generating small images (e.g. 128×128 pixels or less), and at most a GAN may be capable of generating images with a resolution 1000×1000 pixels. Typical diagnostic images have a resolution of about 4,000 (e.g. 3328 pixels×2560 pixels). According to various embodiments, a multi-scale deep learning approach may include a method, computer system, and computer product to train and utilize a plurality of GANs to first produce down-sampled full images with one or more global artifacts removed, then generate full resolution patches with one or more local artifacts removed, and lastly, smoothly integrate the generated patches into the full image to produce a final high-resolution image containing a reduction of global or local artifacts. Such an approach may be used as a pre-processing step in any computer aided detection (CAD) algorithm. Such generation of diagnostic images containing a reduction of global or local artifacts at high-resolution could be used for improved quality of trained CAD algorithms.

Embodiments of the present invention aim to improve the speed, efficiency, and accuracy of diagnostic images by training and utilizing several GANs to generate a high-resolution image containing a reduction of global or local artifacts. Additionally, embodiments of the present invention aim to reduce unnecessary imaging and patient recalls, stress, and inconvenience.

Reference will now be made in detail to the embodiments of the present invention, examples of which are illustrated in the accompanying drawings, wherein like reference numerals refer to like elements throughout. Embodiments of the invention are generally directed to a system for analyzing medical images for global and local artifacts and generating a new image that may be without global and local artifacts or may at least include a reduced number of global and local artifacts as compared with an original image.

FIG. 1 illustrates an artifact removal and image generation system 100, in accordance with an embodiment of this invention. In an example embodiment, the artifact removal and image generation system 100 includes an imaging device 110, a user device 120, and a server 130 interconnected via a network 140.

In the example embodiment, the communication network 140 is the Internet, representing a worldwide collection of networks and gateways to support communications between devices connected to the Internet. The network 140 may include, for example, wired, wireless or fiber optic connections. In other embodiments, the network 140 may be implemented as an intranet, a local area network (LAN), or a wide area network (WAN). In general, the network 140 can be any combination of connections and protocols that will support communications between the imaging device 110, the user device 120, and the server 130.

The imaging device 110 may include the image database 112. The imaging device 110 may be any device capable of capturing the image data 114. The image data 114 may include, but is not limited to, visual, audio, and/or textual data. In an example embodiment, the imaging device 110 may be a medical imaging device employing imaging technology such as, but not limited to, X-ray radiography, magnetic resonance imaging (MRI), medical ultrasonography or ultrasound, endoscopy, elastography, tactile imaging, thermography, medical photography, photoacoustic imaging, electrocardiography, full-field digital mammography (FFDM), digital breast tomosynthesis (DBT), functional near-infrared spectroscopy (FNIR), magnetic particle imaging (MPI). In addition, the imaging device 110 may employ nuclear medicine functional imaging techniques, such as positron emission tomography (PET) and single-photon emission computed tomography (SPECT). The imaging device 110 may be any imaging device capable of capturing the image data 114 and sending the image data 114 to and from other computing devices, such as the user device 120, and the server 130 via the network 140. The image data 114 may include any images captured by the imaging device 110 such as, but not limited to, X-rays, magnetic resonance images (MRIs), ultrasounds, endoscopic images, elastography images, tactile images, thermography images, medical photographs, photoacoustic images, electrocardiographs, functional neuroimages, magnetic particle imaged (MPIs), positron emission tomography (PET) scans, and single-photon emission computed tomography (SPECT) scans. Further, the image data 114 may include data identifying the source of the image data 114 such as, but not limited to, patient name, patient age, sex of the patient, patient medical history including prior images of the patient, the area of imaging (e.g., the left breast), the date of imaging, the location of imaging (e.g., Hospital A), etc. In embodiments of the invention, the imaging device 110 and the user device 120 may be the same device. For example, a medical imaging device may have a computer incorporated into the device or be resident in a computer. The imaging device 110 is described in more detail with reference to FIG. 3.

The image database 112 may store the image data 114, i.e. the visual, audio, and/or textual data, captured by the imaging device 110. The image database 112 may be any storage media capable of storing data capable of storing data, such as, but not limited to, storage media resident in the imaging device 110, a computer system included in or a server coupled to the imaging device 110, and/or in removeable storage media. For example, the image database 112 may be, but is not limited to, a hard drive, a solid stated drive, a USB drive, or a memory card, etc. The image database 112 is described in more detail above and with reference to FIG. 3.

The user device 120 may include the user interface 122. In the example embodiment, the user device 120 may be a cellphone, desktop computer, a notebook, a laptop computer, a tablet computer, a thin client, or any other electronic device or computing system capable of storing compiling and organizing audio, visual, or textual content and receiving and sending that content to and from other computing devices, such as the imaging device 110, and the server 130 via the network 140. While only a single user device 120 is depicted, it can be appreciated that any number of user devices may be part of the artifact removal and image generation system 100. In embodiments of the invention, the imaging device 110 and the user device 120 may be the same device. For example, a medical imaging device may have a computer incorporated into the device or be resident in a computer. The user device 120 is described in more detail with reference to FIG. 3.

The user interface 122 includes components used to receive input from a user on the user device 120 and transmit the input to the artifact removal program 136 residing on the server 130, or conversely to receive information from the artifact removal program 136 and display the information to the user on user device 120. In an example embodiment, the user interface 122 uses a combination of technologies and devices, such as device drivers, to provide a platform to enable users of the user device 120 to interact with the artifact removal program 136. In an example embodiment, the user interface 122 receives input, such as but not limited to, textual, visual or audio input received from a physical input device, such as, but not limited to, a keypad and/or a microphone.

The server 130 may include the program database 132 and the artifact removal program 136. In the example embodiment, the server 130 may be a desktop computer, a notebook, a laptop computer, a tablet computer, a thin client, or any other electronic device or computing system capable of storing, compiling, and organizing, audio, visual, or textual content and receiving and sending that content to and from other computing devices, such as the imaging device 110, and the user device 120 via network 140. In some embodiments, the server 130 includes a collection of devices, or data sources, in order to collect the program data 134. The server 130 is described in more detail with reference to FIG. 3.

The program database 132 may store the program data 134. The program database 132 may be any storage media capable of storing data, such as, but not limited to, storage media resident in the server 130 and/or removeable storage media. For example, the program database 132 may be, but is not limited to, a hard drive, a solid stated drive, a USB drive, or a memory card, etc. The program database 132 is described in more detail below and with reference to FIG. 3.

The program data 134 may be a collection of audiovisual content required by the artifact removal program 136 including, but not limited to, audio, visual and textual content. The program data 134 may be, for example, but not limited to, the image data 114 received and/or collected from the imaging device 110 and the user device 120, the global artifact image 135 received by the artifact removal program 136, and/or the local artifact image 137 received by the artifact removal program 136. The global artifact image 135 and the local artifact image 137 are described in more detail below with reference to FIGS. 1b, 1c, 1d, 2 and 3. Further, the program data 134 may include, but is not limited to, user data, patient data, imaging studied, and medical reports, etc. The program data 134 is located on the server 130 and can be accessed via the network 140. In accordance with an embodiment of the invention, the program data 134 may be located on one or more a plurality of servers 130.

The artifact removal program 136 is a program capable of receiving the image data 114 captured by the imaging device 110 and analyzing the image data 114 to train and utilize a plurality of GANs to produce a down-sampled full image with some or all global artifacts removed, to generate full resolution patches with some or all local artifacts removed, and finally, to smoothly integrate the generated patches into the full image to produce a final image with both global and local artifacts removed or reduced in number. The artifact removal program 136 is described in more detail below with reference to FIG. 1b.

Figure 1B:
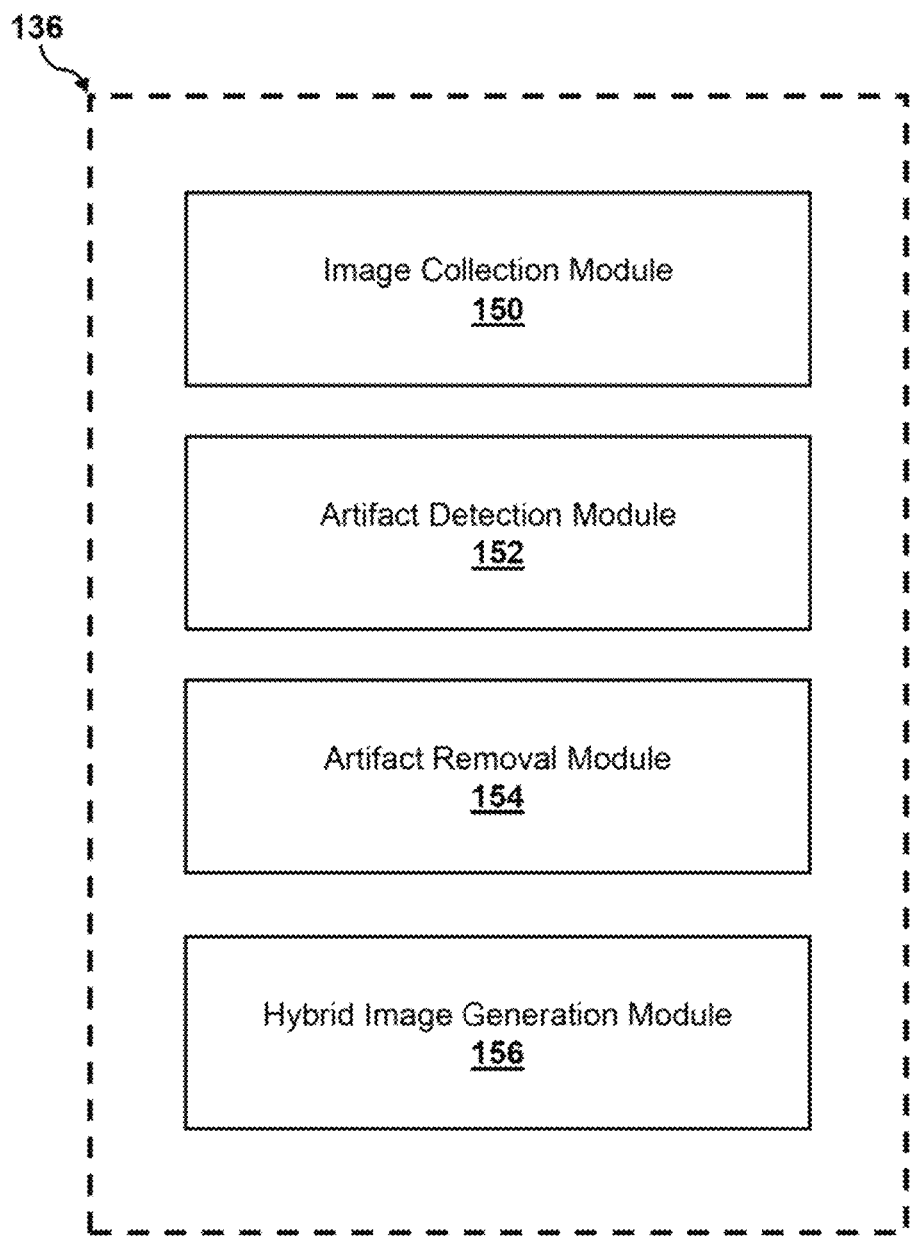

FIG. 1b illustrates example modules of the artifact removal program 136. In an example embodiment, the artifact removal program 136 may include four modules: image collection module 150, artifact detection module 152, artifact removal module 154, and hybrid image generation module 156.

The image collection module 150 receives the image data 114 captured from the imaging device 110. Image data 114 may be collected by the user device 120 and then sent to the server 130 using the network 140. In an alternative embodiment, the image data 114 may be collected directly from the imaging device 110 by the server 130 using the network 140. For example, but not limited to, the user device 120 may collect a primary medical image from the imaging device 110. The medical image would then be sent to the server 130 over the network 140 where it would be received by the image collection module 150 of the artifact removal program 136. In an embodiment of the invention, the image data 114 may be stored in the program data 134 of the program database 132. For example, the image collection module 150 may obtain a primary FFDM image of a patient A from an x-ray machine and store the FFDM image on the program database 132 of the server 130.

Figure 1C:
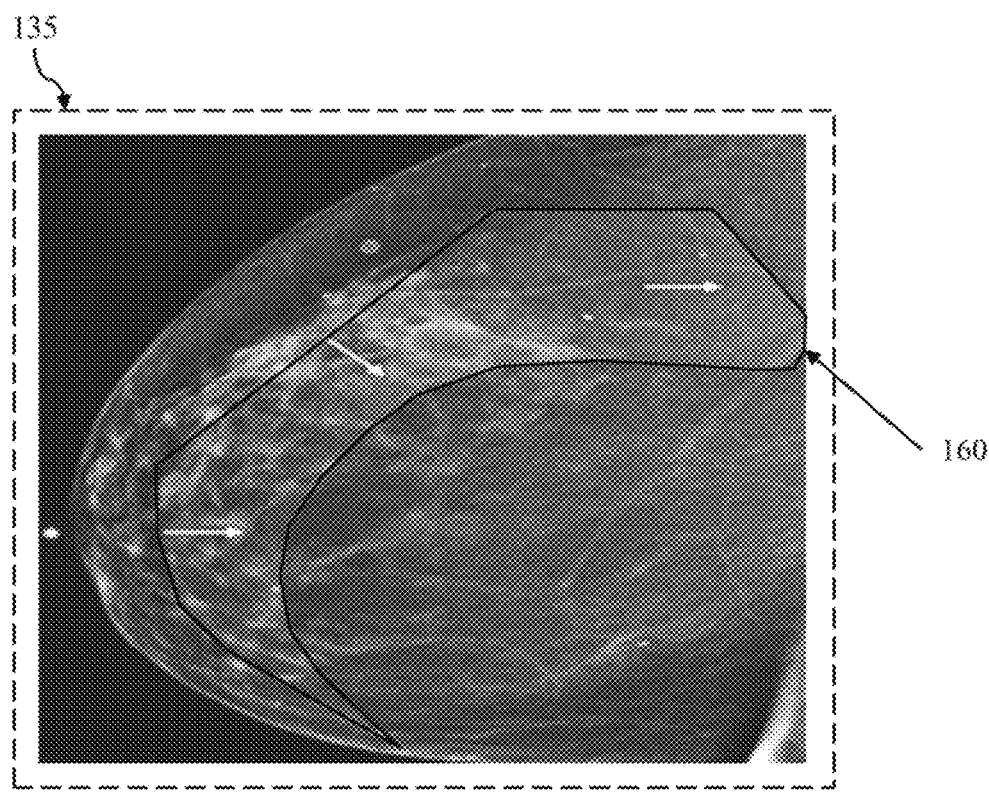
Figure 1D:
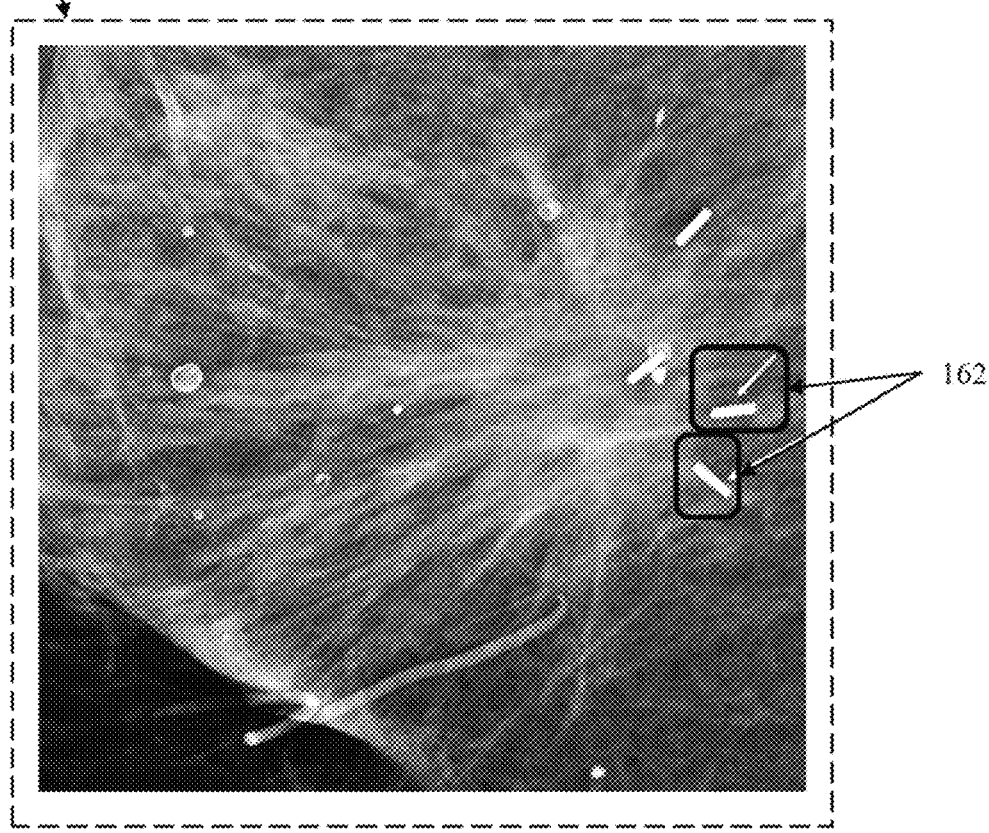

The artifact detection module 152 analyzes the image data 114 to detect artifacts contained within the image data 114. The artifact detection module 152 may first obtain images from, as an example, the program data 134. Further, the artifact detection module 152 is capable of analyzing and identifying artifacts contained within the images. For example, but not limited to, the artifact detection module 152 may analyze obtained DBT images to detect if the DBT images contain artifacts that may be degrading the quality of the image and the accuracy of the diagnosis. The artifact detection module 152 may utilize a Computer Aided Detection (CAD or CADe) algorithm. CAD or CADe algorithms are image-based algorithms that automatically detect a feature within a medical image such as, but not limited to, an anomaly, e.g. an artifact. The artifact detection module 152, in at least one embodiment, may differentiate between a local and a global artifact based on a predefined size threshold, e.g., any artifact larger than 5 mm in diameter or larger than 128 pixels×128 pixels may be deemed a global artifact. The artifact detection module 152 may convert artifact dimensions expressed in mm to a corresponding number of pixels or vice versa based on image size data associated with an image. Global and local artifacts detected by the artifact detection module 152 may be marked as illustrated with reference to FIG. 1c and FIG. 1d, respectively. FIG. 1c illustrates an example image 135 identifying marked global artifacts. FIG. 1d illustrates an example image 137 identifying marked local artifacts. The marking 160 on the global artifact image 135 and the markings 162 on the local artifact image 137 may be, but are not limited to, CAD markings. Furthering the previous example, the primary images of patient A, e.g. obtained DBT images, are analyzed by the artifact detection module 152. After the artifact detection module 152 analyzes the DBT images, the DBT images of the patient A may be identified to have a global paddle artifact and a local artifact. The global artifact may be defined as an artifact larger than the predefined size threshold of 5 mm in diameter. The local artifact may be defined as an artifact smaller than the predefined size threshold of 5 mm in diameter.

The artifact removal module 154 removes global artifacts from the image data 114, such as, but not limited to, the marked global artifact image 135 and the marked local artifact image 137, where applicable. In embodiments, the marked global artifact image 135 may be the same image as the marked local artifact image 137, wherein such image contains both global and local artifacts. In embodiments, the image data 114 may contain images with strictly global artifacts, images with strictly local artifacts, images with a combination of both global and local artifacts, or images with no global or local artifacts. The artifact removal module 154 implements a removal process that may utilize a plurality of generative adversarial networks (GANs) trained with the image data 114. GANs are machine learning systems which utilize two neural networks that compete with each other. A generative neural network generates new data instances while a discriminative neural network evaluates the generated data instances for authenticity. The goal of the generative network is to generate data instances that will be deemed authentic by the discriminative network. The goal of the discriminative network is to recognize data instances generated by the generative network that are not authentic. When a data instance is input to the discriminative network it outputs a probability, e.g., a number between 0 and 1, that the data instance is authentic. GANs are trained with a training set. After successful training, a GAN is able to generate new data with the same statistical properties as the training set. For example, a GAN may be given a training set of images, e.g., image data 114. After successful training on the set of images, the GAN is able to generate images that appear to a human observer as authentic as the training set images.

Figure 2:
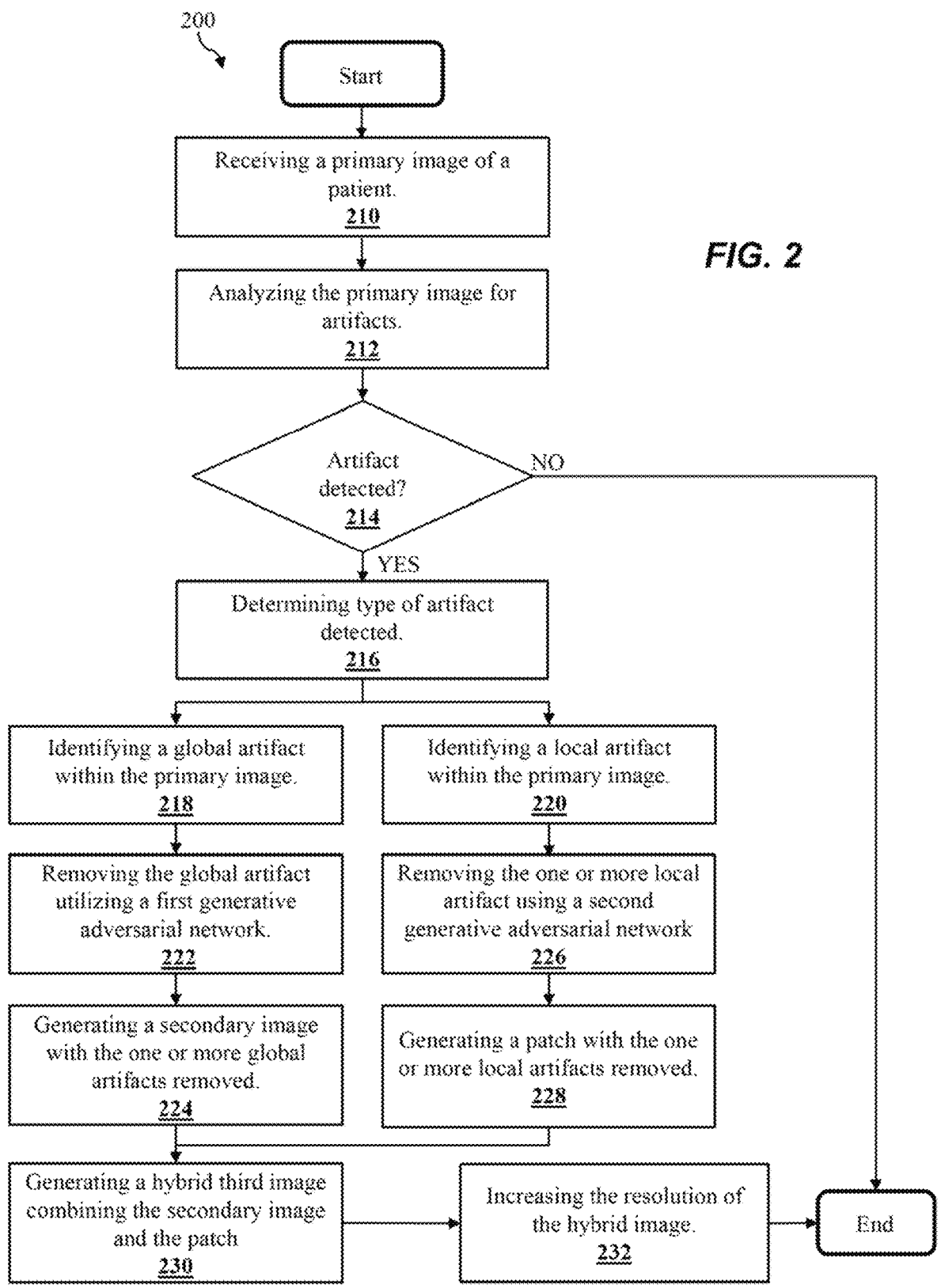
FIG. 2 is a flowchart illustrating an example method of artifact removal and image generation in accordance with an embodiment of the invention.

In embodiments, wherein the primary image contains both global and local artifacts, the artifact removal and image generation system 100 may utilize the artifact removal module 154 of the artifact removal program 136 to simultaneously perform the steps 218, 222, and 224 of FIG. 2 corresponding to the removal of global artifacts and the steps 220, 226, and 228 of FIG. 2 corresponding to the removal of local artifacts, simultaneously or consecutively in any order. In other embodiments, wherein the primary image only contains global artifacts, the artifact removal and image generation system 100 may perform only steps 218, 222, and 224 of FIG. 2 corresponding to the removal of global artifacts. In further embodiments, wherein the primary image only contains local artifacts, the artifact removal and image generation system 100 may perform only the steps 220, 226, and 228 of FIG. 2 corresponding to the removal of local artifacts.

The artifact removal program 136 may train a first GAN using a first training set containing a plurality of paired images, which may be stored as image data 114. The first training set includes images for a plurality of patients. Each pair of images includes first and second images of the same body part from a single patient. Further, the pair of images may be, for example, but not limited to, from the same view, the same size, and/or the same resolution, etc. The first image may be a single image or a plurality of images of a patient captured at a first period of time and the second image may be a single image or a plurality of images of the same patient captured at a second period of time. The first and the second image of the training set differ in time, but also in that at least one of the paired images contains one or more global artifacts, not present within the other image. The first image and the second image of the training set of the first GAN are paired to train the first GAN to take an image containing global artifacts and generate a corresponding new image without global artifacts or with a reduced number of global artifacts. For example, the first GAN may be trained to remove the global artifacts from an image using a training set containing paired images from patient B, patient C, and patient D, all of which have a first image that contains a global artifact and a second image that has no global artifact.

The artifact removal module 154 utilizes the trained first GAN to receive a primary image of a patient collected from the image collection module 150, the primary image containing one or more global artifacts, and one or more previous images of the same patient stored in the program data 134. The artifact removal module 154 generates a secondary image without or with a reduced number of the one or more global artifacts, the area containing the one or more global artifacts being replaced based on the one or more previous images of the same patient stored in the program data 134. Thus, the secondary image is generated based solely on the patient's own image history as it would not be desirable to replace a portion of a patient's medical image with that of another patient. The secondary image may be a low-resolution full image version of the primary image with the global artifacts removed or reduced in number. In general, a GAN is only capable of generating high-resolution small images (e.g. 128 pixels×128 pixels). The first GAN may only be capable of generating a low-resolution full image as the area in which the global artifact covers is generally a larger than 128 pixels×128 pixels.

Continuing the previous example, the first GAN receives a primary image of a breast of patient A that contains a global paddle artifact. The artifact removal module 152 utilizes the first GAN to generate a secondary image with the paddle artifact removed from the primary image of patient A. The generated secondary image of the patient A may be a low-resolution version of the full image that represents the features of the primary image without the paddle artifact, the area of the primary image containing the paddle artifact being replaced with image data based on the same area of prior images, e.g. prior medical images, of patient A contained within the image data 114.

The artifact removal program 136 may train a second GAN using a second training set containing a plurality images, which may be stored as image data 114. The second training set includes images for a plurality of patients. Each pair of images includes first and second images of the same body part from a single patient. Further, the pair of images may be, for example, but not limited to, from the same view, the same size, and/or the same resolution, etc. The first image may be a single image or a plurality of images of a patient captured at a first period of time and the second image may be a single image or a plurality of images of the same patient captured at a second period of time. The first and the second image differ in time, but also in that at least one of the paired images contains one or more local artifacts, not present within the other image. The first image and the second image of the training set of the second GAN are paired to train the second GAN to take an image containing local artifacts, determine a patch for the image containing the local artifact, and generate a corresponding image patch a reduced number of the local artifacts based on the first and second images of the patient. For example, the second GAN may be trained to remove the local artifacts from an image using paired images from patient C, patient D, and patient E, all of which have a first image that contains a local artifact and a second image that has no local artifact.

The artifact removal module 154 utilizes the trained second GAN to receive a primary image of a patient collected from the image collection module 154, the primary image containing one or more local artifacts, and one or more previous images of the same patient stored in the program data 134. The artifact removal module 154 generates a patch without the one or more local artifacts (or with a reduced number of local artifacts) based on the one or more previous images of the same patient stored in the program data 134. The generated patch corresponds to a portion of the primary image containing the one or more local artifacts to be removed. The generated patch may be a high-resolution patch of the primary image with the local artifacts removed. The second GAN is capable of generating a high-resolution patch due to the generally small size of the local artifact found within the primary image data 114. In embodiments of the invention, the patch may be 128 pixels× 128 pixels or less which enables the second GAN to generate a high-resolution patch. While current GANs are only capable of generating small high-resolution images, e.g. 128 pixels×128 pixels, it can be appreciated that as GAN technology progress, larger high-resolution patches, i.e. larger than 128 pixels×128 pixels, may be possible.

Continuing the previous example, the second GAN receives the primary image of patient A that contains a local dust particle artifact. The artifact removal module 152 utilizes the second GAN to generate a high-resolution patch with the local artifact removed from the primary image of patient A. The generated patch represents the features of the primary image now without the local artifact, the area of the primary image containing the local artifact being replaced with image data based on the same area of prior images of patient A contained within the image data 114.

The artifact removal program 136 may train a hybrid GAN using a third training set containing a plurality of hybrid images, which may be stored as image data 114. The third training set includes primary images from a plurality of patients that contain both global and local artifacts that have been processed using the first GAN and the second GAN. The third training set is generated by the hybrid image generation module 156 by incorporating the patch generated by the second GAN into the corresponding secondary image generated by the first GAN to produce a hybrid image, i.e. the patch and secondary image are of the same patient. The un-paired hybrid images from a plurality of different patients are then used to train the hybrid GAN to generate a high-resolution hybrid image that may contain neither global nor local artifacts by smoothly inserting the generated patch of the second GAN into the generated full image of the first GAN. For example, the hybrid image generation module 156 may generate hybrid images with global and local artifacts removed from patient C and patient D utilizing the secondary images generated by first GAN and the patches generated by the second GAN.

The hybrid image generation module 156 utilizes the trained hybrid GAN to receive the secondary image generated by the first GAN and the patch generated by the second GAN to generate a high-resolution hybrid image with the patch smoothly inserted into the secondary image. In embodiments, the hybrid image generation module 156 obtains the plurality of generated data (e.g., patches, secondary images) from the artifact removal module 154. The hybrid image generation module 156 then replaces the corresponding area of the low-resolution full image generated by the first GAN, i.e., the secondary image, with the high-resolution patch containing no or a reduced number of local artifacts generated by the second GAN. The hybrid image generation module 156, using the hybrid GAN, creates a continuous transition between the inserted high-resolution patch and the low-resolution secondary image. The hybrid image generation module 156 may further increase the resolution of the generated hybrid image. The hybrid image generation module 156 may increase the resolution of the generated hybrid image without global or local artifacts (or with a reduced number of global or local artifacts) using known resolution enhancement techniques or technologies.

In at least one embodiment, wherein the received primary image contains only a global artifact, the second GAN and the hybrid generation module 156 may not be used, as there will not be any generated high-resolution patch to insert into the generated low-resolution full image.

In at least one embodiment, wherein the received primary image contains only a local artifact, the hybrid generation module 156 may be used to merge the generated high-resolution patch of the second GAN with the primary image received by the image collection module 150.

In expanding upon the previous example, the hybrid image generation module 156 utilizes the hybrid GAN to generate a hybrid image of patient A. The hybrid image generation module 156 obtains the high-resolution patch generated by the second GAN that contains no or at least a reduction in a number of dust particles present in a primary image and inserts the patch into a corresponding area of the generated low-resolution full image of the first GAN containing a reduction of paddle artifact, i.e., the secondary image. The hybrid image generation module 156 further makes the transition of the inserted patch and the full image continuous and may increase the resolution of the hybrid image.

In another embodiment, the artifact removal program 136 may combine the first GAN, the second GAN, and the hybrid GAN into a single network in which the outputs from the first GAN and the second GAN are merged together within the network. Training of such a network would occur with unpaired images containing global and local artifacts and images containing no global or local artifacts.

Referring to FIG. 2, a method 200 for image artifact removal is depicted in accordance with an embodiment of the present invention.

Referring to block 210, the image collection module 150 receives a primary image of a patient contained within the image data 114 captured from the imaging device 110. Image collection is described in more detail above with reference to the image collection module 150 of FIG. 1b.

Referring to block 212, the artifact detection module 152 analyzes a primary image of a patient contained within the image data 114 to detect any artifacts contained within the image data 114. Artifact detection is described in more detail above with reference to the artifact detection module 152 of FIG. 1b.

Referring to block 214, if the artifact detection module 152 detects an artifact within the primary image, the artifact removal program 136 may proceed to block 216. If the artifact detection module 152 does not detect any artifacts within the primary image, the artifact removal program 136 may terminate. Artifact detection is described in more detail above with reference to the artifact detection module 152 of FIG. 1b.

Referring to block 216, the artifact detection module 152 determines the type of artifact detected within the primary image. Artifact differentiation is described in more detail above with reference to the artifact detection module 152 of FIG. 1b.

Referring to block 218, if the artifact detection module 152 identifies a global artifact within the primary image and the artifact removal program 136 may proceed through blocks 222-224.

Referring to block 220, if the artifact detection module 152 identifies a local artifact within the primary image and the artifact removal program 136 may proceed through blocks 226-228.

It can be appreciated that the artifact detection module 152 may identify both a global artifact and a local artifact within the primary image and the artifact removal program 136 may proceed through blocks 222-224 and blocks 226-228. The artifact removal program 136 may proceed through blocks 222-224 and blocks 226-228 simultaneously or in succession with blocks 222-224 occurring first and block 226-228 occurring second or vice versa.

Referring to block 222, the artifact removal module 154 removes the global artifact from the primary image utilizing a first generative adversarial network. Artifact removal is described in more detail above with reference to the artifact removal module 154 of FIG. 1b.

Referring to block 224, the artifact removal module 154 generates a secondary image with the global artifact of the primary image removed. Secondary image generation is described in more detail above with reference to the artifact removal module 154 of FIG. 1b.

Referring to block 226, the artifact removal module 154 removes the local artifact from primary image utilizing a second generative adversarial network. Artifact removal is described in more detail above with reference to the artifact removal module 154 of FIG. 1b.

Referring to block 228, the artifact removal module 154 generates a patch with the local artifact of the primary image removed. Patch generation is described in more detail above with reference to the artifact removal module 154 of FIG. 1b.

Referring to block 230, the hybrid image generation module 156 generates a hybrid image combining the secondary image generated by the first GAN and the patch generated by the second GAN. Hybrid image generation is described in more detail above with reference to the hybrid image generation module 156.

Referring to block 232, the hybrid image generation module 156 increases the resolution of the hybrid image. The process to increase resolution of the generated hybrid image is described in more detail above with reference to the image resolution module 158 of FIG. 1b.

Figure 3:
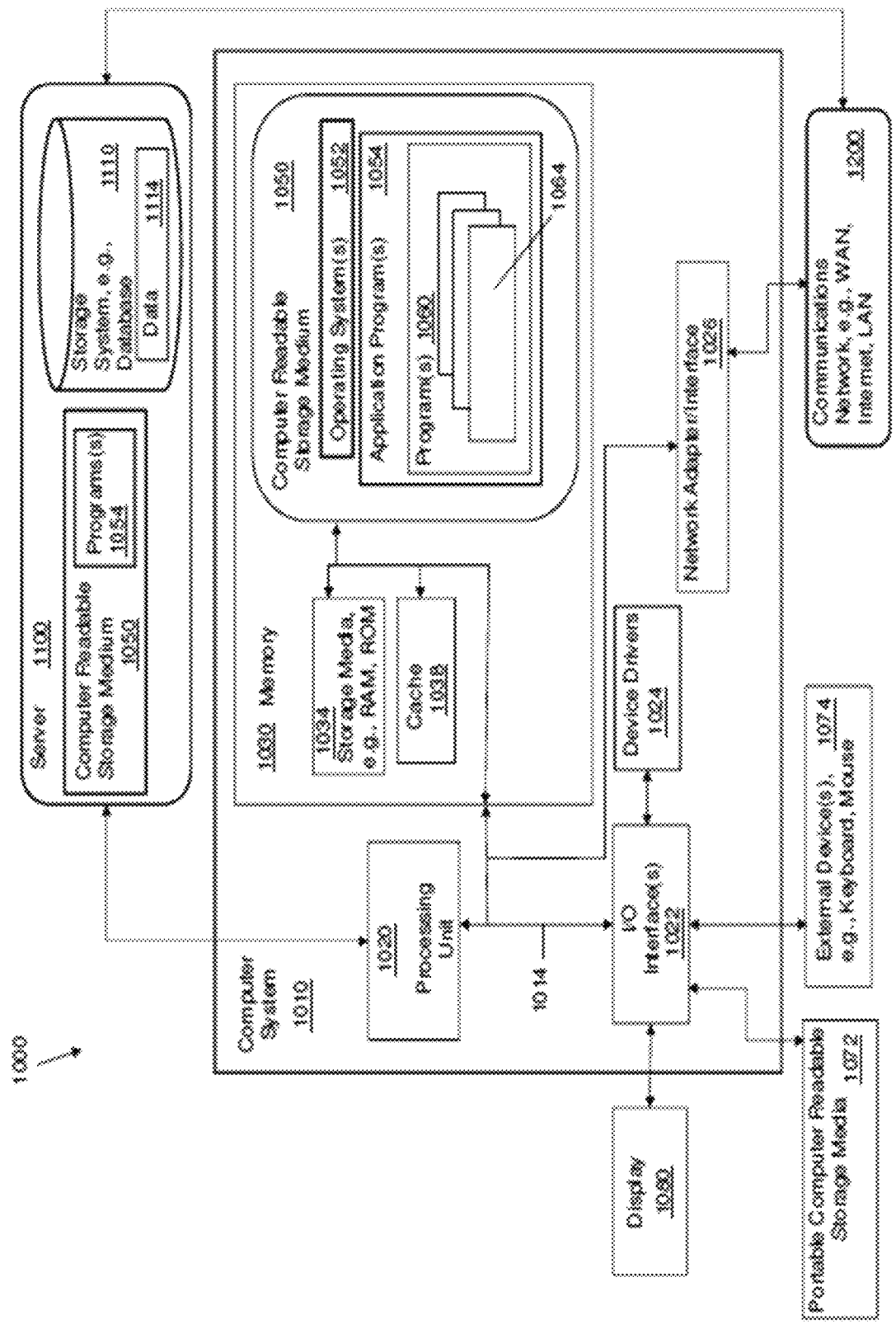
FIG. 3 is a block diagram depicting the hardware components of the artifact removal and image generation system of FIG. 1, in accordance with an embodiment of the invention.

Referring to FIG. 3, a system 1000 includes a computer system or computer 1010 shown in the form of a generic computing device. The method 200, for example, may be embodied in a program(s) 1060 (FIG. 3) embodied on a computer readable storage device, for example, generally referred to as memory 1030 and more specifically, computer readable storage medium 1050 as shown in FIG. 3. For example, memory 1030 can include storage media 1034 such as RAM (Random Access Memory) or ROM (Read Only Memory), and cache memory 1038. The program 1060 is executable by the processing unit or processor 1020 of the computer system 1010 (to execute program steps, code, or program code). Additional data storage may also be embodied as a database 1110 which can include data 1114. The computer system 1010 and the program 1060 shown in FIG. 3 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 3 as program modules 1064. The program 1060 and program modules 1064 can execute specific steps, routines, sub-routines, instructions or code, of the program.

The methods of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 3, the system 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media 1034 in the form of volatile memory, such as random access memory (RAM), and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database such as the image database 112 or the program database 132) for storing data 1114, e.g. image data 114 or the program data 134, and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention. As such, the computing device in FIG. 4 becomes specifically configured to implement mechanisms of the illustrative embodiments and specifically configured to perform the operations and generated the outputs of described herein for determining a route based on a user's preferred environmental experiences.

The method 200 (FIG. 2), for example, may be embodied in one or more computer programs, generically referred to as a program(s) 1060 and can be stored in memory 1030 in the computer readable storage medium 1050. The program 1060 can include program modules 1064. The program modules 1064 can generally carry out functions and/or methodologies of embodiments of the invention as described herein. For example, the program modules 1064 can include the modules 150-156 described above with reference to FIG. 1*b*. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
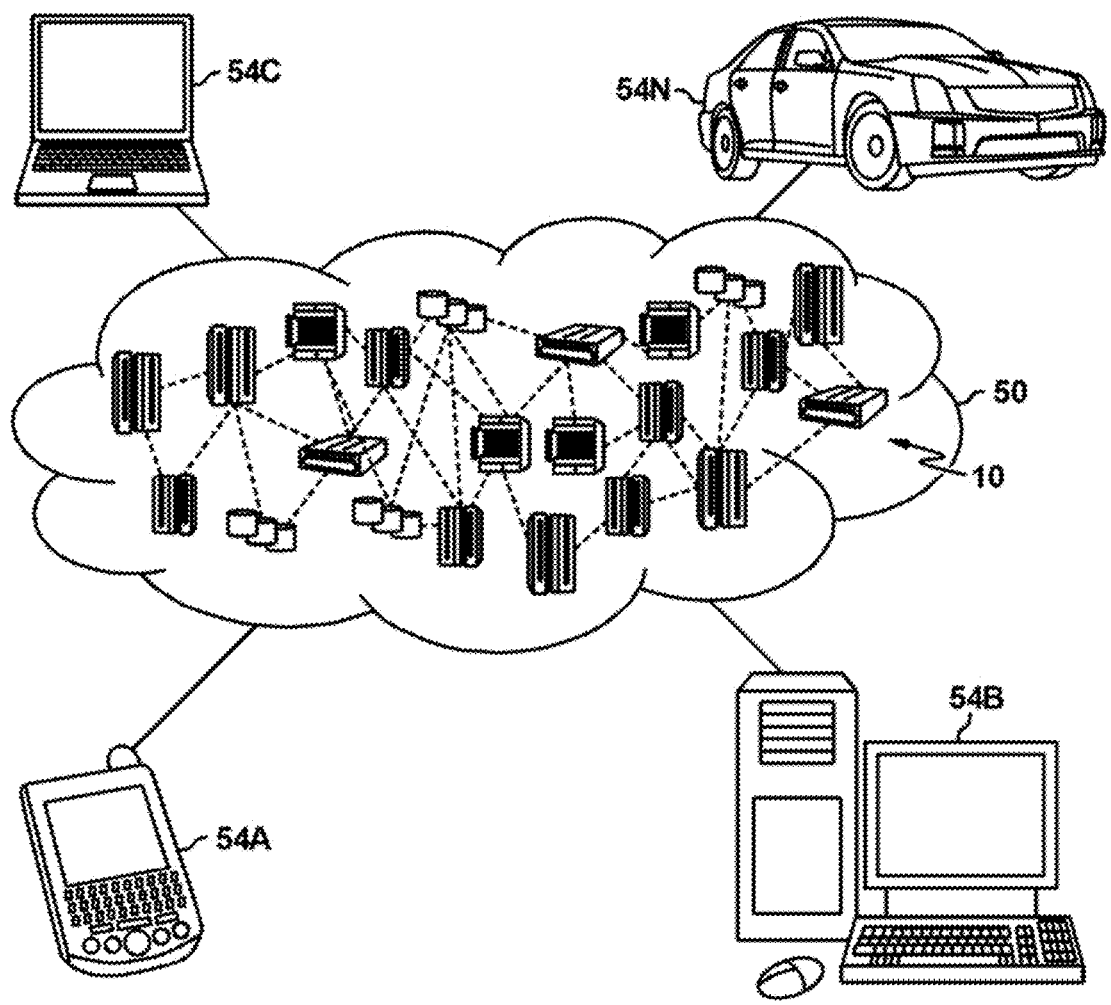
FIG. 4 illustrates a cloud computing environment, in accordance with an embodiment of the invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
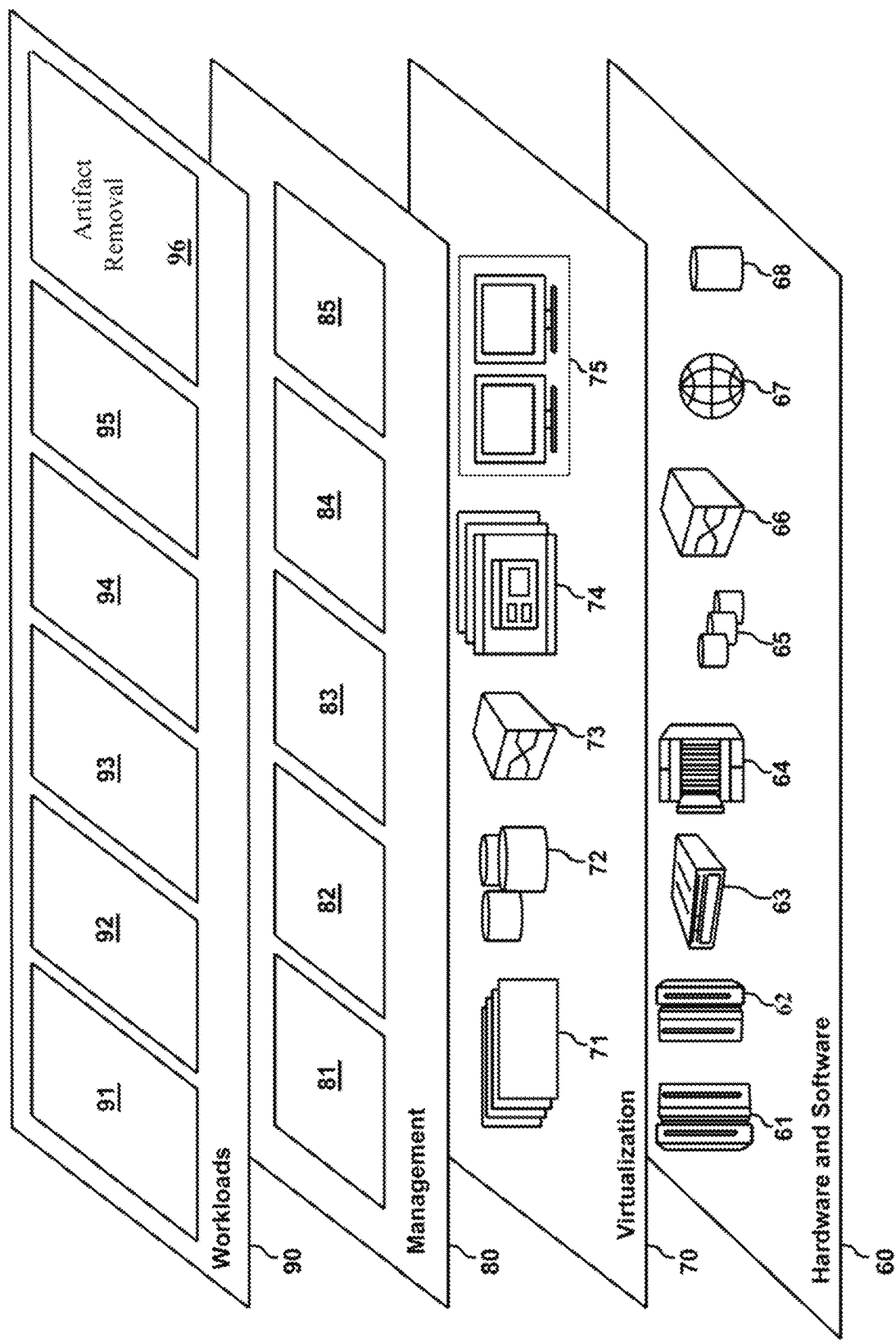
FIG. 5 illustrates a set of functional abstraction layers provided by the cloud computing environment of FIG. 4, in accordance with an embodiment of the invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and artifact removal 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A method for removing image artifacts, further comprising:
   receiving a primary image, wherein the primary image is a medical image;
   analyzing the primary image for global artifacts and local artifacts;
   in response to identifying a global artifact in the primary image, generating a secondary image with the global artifact removed, the secondary image being generated utilizing a first generative adversarial network;
   in response to identifying a local artifact in the primary image, generating a patch with the local artifact removed, the patch being generated utilizing a second generative adversarial network, wherein the patch corresponds to an area of the primary image containing the local artifact; and
   generating a hybrid image containing a reduction of global artifact and a reduction of local artifact by combining the secondary image and the patch, the hybrid image being generated utilizing a hybrid generative adversarial network.

2. The method of claim 1, further comprising:
   increasing resolution of the hybrid image.

3. The method of claim 1, further comprising:
   training the first generative adversarial network, wherein training the first generative adversarial network comprises:
      receiving a first image of a patient captured at a first period of time, wherein the first image contains a global artifact;
      receiving a second image of the patient captured at a second period of time, wherein the second image does not contain a global artifact;
      pairing the received first image and the received second image of the patient; and
      inputting the paired first image and second image of the patient into the first generative adversarial network to train the first generative adversarial network to generate an image of the patient without the global artifact based on the second image of the patient.

4. The method of claim 1, further comprising:
   training the second generative adversarial network, wherein training the second generative adversarial network comprises:
      receiving a first image of a patient captured at a first period of time, wherein the first image contains a local artifact;
      receiving a second image of the patient captured at a second period of time, wherein the second image does not contain a local artifact;
      pairing the received first image and the received second image of the patient; and
      inputting the paired first image and second image of the patient into the second generative adversarial network to train the second generative adversarial network to generate a patch for the first image with the local artifact removed based on the second image of the patient.

5. The method of claim 1, further comprising:
   training the hybrid generative adversarial network, wherein training the hybrid generative adversarial network comprises:
      receiving a plurality of unpaired images and patches of a plurality of patients containing no global or local artifacts; and
      inputting the plurality of unpaired images and patches into the hybrid generative adversarial network to train the hybrid generative adversarial network to generate an image with a patch smoothly integrated into a hybrid image.

6. The method of claim 1, wherein the global artifact comprises one or more of the group consisting of: image ghosting, a paddle artifact, field inhomogeneity, underexposure, or a blur.

7. The method of claim 1, wherein the local artifact comprises one or more of the group consisting of: a biopsy clip, dust on a compression paddle, antiperspirant, or hair.

8. The method of claim 1, wherein the secondary image is a low-resolution full image and the patch is a high-resolution patch.

9. A computer program product for removing image artifacts, the computer program product comprising:
   a computer-readable storage medium having program instructions embodied therewith, wherein the computer readable storage medium is not a transitory signal per se, the program instructions executable by a computer to cause the computer to perform a method, comprising:
      receiving a primary image, wherein the primary image is a medical image;
      analyzing the primary image for global artifacts and local artifacts;
      in response to identifying a global artifact in the primary image, generating a secondary image with the global artifact removed, the secondary image being generated utilizing a first generative adversarial network;
      in response to identifying a local artifact in the primary image, generating a patch with the local artifact removed, the patch being generated utilizing a second generative adversarial network, wherein the patch corresponds to an area of the primary image containing the local artifact; and
      generating a hybrid image containing a reduction of global artifact and a reduction of local artifact by combining the secondary image and the patch, the hybrid image being generated utilizing a hybrid generative adversarial network.

10. The computer program product of claim 9, further comprising:
    increasing resolution of the hybrid image.

11. The computer program product of claim 9, further comprising:

training the first generative adversarial network, wherein training the first generative adversarial network comprises:
receiving a first image of a patient captured at a first period of time, wherein the first image contains a global artifact;
receiving a second image of the patient captured at a second period of time, wherein the second image does not contain a global artifact;
pairing the received first image and the received second image of the patient; and
inputting the paired first image and second image of the patient into the first generative adversarial network to train the first generative adversarial network to generate an image of the patient without the global artifact based on the second image of the patient.

12. The computer program product of claim 9, further comprising:
training the second generative adversarial network, wherein training the second generative adversarial network comprises:
receiving a first image of a patient captured at a first period of time, wherein the first image contains a local artifact;
receiving a second image of the patient captured at a second period of time, wherein the second image does not contain a local artifact;
pairing the received first image and the received second image of the patient; and
inputting the paired first image and second image of the patient into the second generative adversarial network to train the second generative adversarial network to generate a patch for the first image with the local artifact removed based on the second image of the patient.

13. The computer program product of claim 9, further comprising:
training the hybrid generative adversarial network, wherein training the hybrid generative adversarial network comprises:
receiving a plurality of unpaired images and patches of a plurality of patients containing no global or local artifacts; and
inputting the plurality of unpaired images and patches into the hybrid generative adversarial network to train the hybrid generative adversarial network to generate an image with a patch smoothly integrated into a hybrid image.

14. The computer program product of claim 9, wherein the global artifact comprises one or more of the group consisting of: image ghosting, a paddle artifact, field inhomogeneity, underexposure, or a blur and wherein the local artifact comprises one or more of the group consisting of: a biopsy clip, dust on a compression paddle, antiperspirant, or hair.

15. A system for removing image artifacts, the system comprising:
a computer system comprising, a processor, a computer readable storage medium, and program instructions stored on the computer readable storage medium being executable by the processor to cause the computer system to:
receiving a primary image, wherein the primary image is a medical image;
analyzing the primary image for global artifacts and local artifacts;
in response to identifying a global artifact in the primary image, generating a secondary image with the global artifact removed, the secondary image being generated utilizing a first generative adversarial network;
in response to identifying a local artifact in the primary image, generating a patch with the local artifact removed, the patch being generated utilizing a second generative adversarial network, wherein the patch corresponds to an area of the primary image containing the local artifact; and
generating a hybrid image containing a reduction of global artifact and a reduction of local artifact by combining the secondary image and the patch, the hybrid image being generated utilizing a hybrid generative adversarial network.

16. The system of claim 15, further comprising:
increasing resolution of the hybrid image.

17. The system of claim 15, further comprising:
training the first generative adversarial network, wherein training the first generative adversarial network comprises:
receiving a first image of a patient captured at a first period of time, wherein the first image contains a global artifact;
receiving a second image of the patient captured at a second period of time, wherein the second image does not contain a global artifact;
pairing the received first image and the received second image of the patient; and
inputting the paired first image and second image of the patient into the first generative adversarial network to train the first generative adversarial network to generate an image of the patient without the global artifact based on the second image of the patient.

18. The system of claim 15, further comprising:
training the second generative adversarial network, wherein training the second generative adversarial network comprises:
receiving a first image of a patient captured at a first period of time, wherein the first image contains a local artifact;
receiving a second image of the patient captured at a second period of time, wherein the second image does not contain a local artifact;
pairing the received first image and the received second image of the patient; and
inputting the paired first image and second image of the patient into the second generative adversarial network to train the second generative adversarial network to generate a patch for the first image with the local artifact removed based on the second image of the patient.

19. The system of claim 15, further comprising:
training the hybrid generative adversarial network, wherein training the hybrid generative adversarial network comprises:
receiving a plurality of unpaired images and patches of a plurality of patients containing no global or local artifacts; and
inputting the plurality of unpaired images and patches into the hybrid generative adversarial network to train the hybrid generative adversarial network to generate an image with a patch smoothly integrated into a hybrid image.

20. The system of claim 15, wherein the global artifact comprises one or more of the group consisting of: image ghosting, a paddle artifact, field inhomogeneity, underexposure, or a blur and wherein the local artifact comprises one or more of the group consisting of: a biopsy clip, dust on a compression paddle, antiperspirant, or hair.

* * * * *